Patented Nov. 10, 1925.

1,560,926

UNITED STATES PATENT OFFICE.

HENRY H. WILKINSON, OF BROOKLYN, NEW YORK, ASSIGNOR TO UNION SULPHUR COMPANY, A CORPORATION OF NEW JERSEY.

METHOD OF PRODUCING AN ALLOTROPIC FORM OF SULPHUR.

No Drawing.   Application filed December 20, 1923.   Serial No. 681,822.

*To all whom it may concern:*

Be it known that I, HENRY H. WILKINSON, a citizen of the United States, residing in Brooklyn, county of Kings, New York, have invented a new and useful Method of Producing an Allotropic Form of Sulphur, of which the following is a specification.

In the usual methods of sulphur purification there is produced a material commonly designated as "flowers of sulphur", usually containing considerable amounts of sulphur insoluble in carbon bisulfide, and invariably slightly acid in reaction. Due to the manufacturing methods usually employed, this flowers of sulphur is usually contaminated with sulphur dioxide, which latter is removable therefrom only with great difficulty. As the presence of sulphur dioxide in sulphur is objectionable for many purposes of use, a method for the preparation of sulphur free from sulphur dioxide and having otherwise new and valuable properties appears desirable.

In application Serial No. 677184 there is described a process for the purification of sulphur, involving the distillation or sublimation of the same under high vacuum and in the absence of notable amounts of oxidizing gases. I have now discovered that if, in the operation of the vacuum distillation process, a small amount of some gas or vapor be admitted to the still in which the sulphur is being heated and during the vaporization of the sulphur—the amount of gas or vapor so admitted being insufficient in amount to materially lower the vacuum—a much larger yield of the allotropic form of sulphur is obtained, and possessing the new and desirable properties heretofore described by me.

For example, if in a given operation of my process, the amount of purified, finely divided, light sulphur produced per hour be 100 pounds, the admission of inert gas at or near the surface of the boiling sulphur, in amount insufficient to lower the vacuum maintained by more than two inches of mercury column, increases the yield per hour to 200 pounds or more, while the appearance and properties of the sulphur obtained remains substantially the same. The sulphur thereby obtained is in fine particles spherical or spheroidal in shape, quite uniform in size, and of great lightness, porosity and fluffiness.

As a non-oxidizing gas suitable for introduction, I have found nitrogen suitable but unduly expensive, preferring to employ a gas high in carbon dioxide, either as flue gas or carbon dioxide directly introduced from the liquefied material from cylinders. With the use of flue gas, it will be understood that the particles of carbon will first be removed by a scrubbing or filtering device, before being allowed to pass over the sulphur, whereas pure carbon dioxide requires no preliminary mechanical treatment before use.

The color of the sulphur thus produced varies from a bright yellow to orange, differing in this respect from sulphur produced by other processes. The introduction in the manner indicated of carbon dioxide or other non-oxidizing gas or gases in the apparatus, does not result in the formation of appreciable amounts of sulphur dioxide, and the final product of purified sulphur obtained is, therefore, neutral in character.

I have found that the production of this allotropic form of purified sulphur may be successfully carried out in ordinary iron or sheet steel apparatus, and that the sulphur may be condensed without artificial cooling, the current of non-oxidizing gas or vapor serving to assist in the precipitation and subsidence of the minute particles of purified sulphur. The formation of this material appears to bear a close resemblance to the formation of snow in the atmosphere, the sulphur produced bearing the same resemblance to the natural sulphur that snow does to water, and being considerably lighter in weight per cubic foot.

In one method used by me for producing this allotropic form of sulphur, a quantity of relatively impure sulphur, which may or may not have previously been melted, is placed in a substantially flat-bottomed or other suitably shaped cast iron still of required size, the shape and size of the still being modified depending upon the amount of sulphur to be produced in a given period of time, and heated to a temperature from 160° C. to 300° C. The higher the vacuum maintained in the system, the lower will be the temperature at which the sulphur will become vaporized. As an illustration, I have found that in a still having a vapor rise of about 24 inches, the sulphur will freely vaporize at a temperature of 260° C. at 27 inches of mercury column; with a temperature of 292° C., at 26 inches; and at 334° C., at 25 inches, while under a practically absolute vacuum, say from 29.5 to 30 inches, the sulphur will vaporize at from 140° C. to 160° C.

When the sulphur begins to vaporize, there will also form relatively heavier vapors of elemental sulphur which have a tendency to remain in the still and blanket the liquid sulphur so that there appears to be an appreciable increase in pressure upon the surface of the liquid sulphur, causing it to boil at a higher temperature. If the heat be sufficiently increased, it is possible to drive this heavy vapor over into the receiver, but comparatively, the amount of heat required is excessive, and the vapors are superheated to a degree where they condense in the receiver in the form of liquid sulphur, but still of high purity. Now I have been able to minimize and to eliminate this formation of liquid sulphur in the receiver, by the introduction of a suitable non-oxidizing gas as carbon dioxide in proper amounts into the still. I have found that when a permanent gas such as carbon dioxide, nitrogen, flue gas or the like, is slowly admitted in small amounts into the zone of the above mentioned sulphur vapor, the said vapor will at once condense in the form of minute, amorphous, spherical or spheroidal particles.

The action of the vacuum pump, which maintains a higher vacuum in the receiver than in the still, will have a tendency to cause a current of gas to flow from the still to the receiver, and by increasing what may be termed as circulation in this manner, increase the yield of desirable product in a unit length of time. This current of non-oxidizing gas as carbon dioxide entrains the particles of sulphur formed, and, due to the substantial absence of gases in the receiver, permits these particles to rapidly subside, where they collect on the bottom and elsewhere on the receiver in the form of a powder. I have found that the admission to the still of a current of non-oxidizing or indifferent gas sufficient to lower the vacuum in the system by not more than two inches below that present in the system before admission of the non-oxidizing or indifferent gas or vapor gives excellent results. In an apparatus having (say) four square feet of heating surface, and with a depth of four to eight inches of sulphur in the still, I obtained from four to seven pounds of this allotropic form of sulphur, per square foot of heating surface per hour, without the simultaneous production of liquid sulphur in the receiver. Where the temperature in the still was raised to the point where liquid sulphur is produced in the receiver, the amount of sulphur in finely divided form is materially increased over the illustrative figures above given.

With a receiver of sufficient size, and with proper temperature and vacuum control, very little if any sulphur is carried beyond the receiver, but a dust collector may be inserted between the receiver and vacuum pump to protect the latter. I have found that passing the gases issuing from the receiver through water removes all traces of sulphur from the same, so that the gases may safely be allowed to traverse the pump. These gases may, if desired, be collected from the exhaust of the vacuum pump, compressed, purified and re-used.

Having now described my method for the production of a brilliantly colored, allotropic form of finely divided sulphur of light weight, what I claim as new and desire to protect by Letters Patent is:—

1. A process for the production of an allotropic form of sulphur consisting in heating sulphur under a practical vacuum in a still until the sulphur has liquefied and gives off vapors, transferring said vapors still under vacuum and assisted by a current of non-oxidizing gas substantially inert to the sulphur, into a vacuum receiver, then condensing said vapors still under vacuum, the finished product forming finely divided, deep yellow, highly purified, light weight, allotropic sulphur of substantially equal sized particles, and free from sulphur dioxide.

2. A process for the production of an allotropic form of sulphur consisting in heating sulphur under a practical vacuum in a still until the sulphur has liquefied and gives off vapors, transferring said vapors still under vacuum and assisted by a current of flue gas substantially inert to the sulphur, into a vacuum receiver, then condensing said vapors still under vacuum, the finished product forming finely divided, deep yellow, highly purified, light weight, allotropic sulphur of substantially equal sized particles, and free from sulphur dioxide.

3. A process for the production of an allotropic form of sulphur consisting in heating sulphur under a practical vacuum in a still until the sulphur has liquefied and gives off vapors, transferring said vapors still under vacuum and assisted by a current of carbon dioxide gas substantially inert to the sulphur, into a vacuum receiver, then condensing said vapors still under vacuum, the finished product forming finely divided, deep yellow, highly purified, light weight, allotropic sulphur of substantially equal sized particles, and free from sulphur dioxide.

4. A process for the production of an allotropic form of sulphur consisting in heating sulphur under a practical vacuum in a still until the sulphur has liquefied and gives off vapors, transferring said vapors still under vacuum and assisted by a current of nitrogen gas substantially inert to the sulphur, into a vacuum receiver, then condensing said vapors still under vacuum, the finished product forming finely divided, deep yellow, highly purified, light weight, allotropic sulphur of substantially equal sized particles, and free from sulphur dioxide.

5. A process for the production of an allotropic form of sulphur in finely divided, deep yellow, light weight and equal size, amorphous particles, involving the following steps: (1) placing commercial or anhydrous sulphur in a still under vacuum; (2) melting said sulphur and continuing heating until vapors of sulphur are given off; (3) leading said vapors into a vacuum chamber as receiver, aiding the transference of vapors from still to receiver by lowering the vacuum in the apparatus system by about two inches by the gradual introduction in small quantities of carbon dioxide or other gas inert towards the sulphur vapor; (4) then condensing said vapors still under greatly diminished pressure, and (5) removing the sulphur from the receiver in a suitable manner.

6. In a process for the distillation of sulphur under diminished pressure, the admission to the apparatus of small amounts of carbon dioxide gas or other vapor inert under the conditions of working to the finely divided sulphur formed, said admitted vapor or gas causing an increase in yield of the minute, amorphous, spherical or spheroidal particles of highly purified sulphur formed, substantially as described.

7. In the purification of sulphur by vacuum distillation, that step which involves condensation of the sulphur vapors formed in substantially spheroidal particles of light weight, by the admission to the apparatus at a suitable point, of a relatively small amount of carbon dioxide gas or carbon dioxide containing vapor inert to the sulphur under the conditions of operation, said carbon dioxide gas or carbon dioxide containing vapor being introduced in amounts insufficient to lower the vacuum of the system more than two or three inches of mercury column.

This specification signed this twenty-seventh day of November, 1923.

HENRY H. WILKINSON.